(12) United States Patent
Hsu

(10) Patent No.: US 8,260,792 B1
(45) Date of Patent: Sep. 4, 2012

(54) SYSTEM AND METHOD FOR COMMITTING DATA OBJECTS TO BE IMMUTABLE

(75) Inventor: Windsor W. Hsu, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 585 days.

(21) Appl. No.: 12/201,957

(22) Filed: Aug. 29, 2008

(51) Int. Cl.
*G06F 17/30* (2006.01)
*G06F 7/00* (2006.01)

(52) U.S. Cl. .................................................. 707/756

(58) Field of Classification Search .................. None
See application file for complete search history.

(56) References Cited

U.S. PATENT DOCUMENTS

| | | | | |
|---|---|---|---|---|
| 7,149,860 | B2 * | 12/2006 | Nonaka et al. | 711/162 |
| 7,346,599 | B2 * | 3/2008 | Ogawa et al. | 726/2 |
| 7,463,590 | B2 * | 12/2008 | Mualem et al. | 370/241 |
| 7,464,407 | B2 * | 12/2008 | Nakae et al. | 726/22 |
| 7,467,273 | B2 * | 12/2008 | Ishida et al. | 711/163 |

* cited by examiner

*Primary Examiner* — Sathyanarayan Pannala
(74) *Attorney, Agent, or Firm* — Blakely Sokoloff Taylor & Zafman LLP

(57) ABSTRACT

Techniques for committing data objects to be immutable are described herein. According to one embodiment, in response to a request received through an interface of a storage system, the request being associated with a data object stored in the storage system, it is determined whether the data object should be committed to be immutable. The data object is committed to be immutable if it is determined that the data object should be committed to be immutable. Thereafter, an action associated with the request is performed, where the action is performed dependent upon whether the data object is immutable. Other methods and apparatuses are also described.

22 Claims, 5 Drawing Sheets

SYSTEM AND METHOD FOR COMMITTING DATA OBJECTS TO BE IMMUTABLE

FIELD OF THE INVENTION

The present invention relates generally to data storage. More particularly, this invention relates to write-once-read-many (WORM) storage.

BACKGROUND

Electronic records can be modified relatively easily and without leaving much of a trace. As organizations increasingly rely on electronic records, it is important to protect these records from both accidental and intentional modification including deletion by, for example, storing the records in some forms of storage that disallows update and/or delete. Such storage is generally referred to as WORM storage.

In particular, one approach is to write the electronic records to a storage system that protects data from modification as data is written to it. This type of commit-on-the-fly approach is, however, overly restrictive and cumbersome for protecting whole data objects from modification.

Another approach is to allow normal update operations against a data object until an explicit signal is received to commit the data object to be immutable. Such an approach, however, requires applications to be modified to issue a specific commit signal. Without support from the applications, a user has to explicitly issue the commit signal or write scripts to issue the commit signal, both of which tend to be laborious and error-prone.

The storage system can automatically commit data objects that match a certain criteria to be immutable. However, as with other techniques that do not rely on application support, determining when a data object is ready to be committed is difficult, especially when the record is received through a network file protocol that may not have an explicit "object close" API (application programming interface).

One technique is to commit a data object to be immutable after the data object has not been accessed for a predetermined period of time. The number of data objects that must be tracked for this technique could, however, be very large. Another technique is to periodically scan the data objects to commit those objects that have not been updated recently, but this becomes increasingly inefficient as the number of objects in the system grows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for committing data objects to be immutable are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, a data object such as, for example, a file, a document, an email, a record, etc. is committed to be immutable only when it becomes necessary for the data object to be committed to be immutable. Specifically, a data object is committed to be immutable only when the system receives a request that requires different handling depending on whether the data object is immutable. For example, a request that queries whether a data object is immutable is clearly dependent on whether the data object is immutable, and a request that attempts to modify a data object should be rejected if the data object is immutable.

Figure 1:
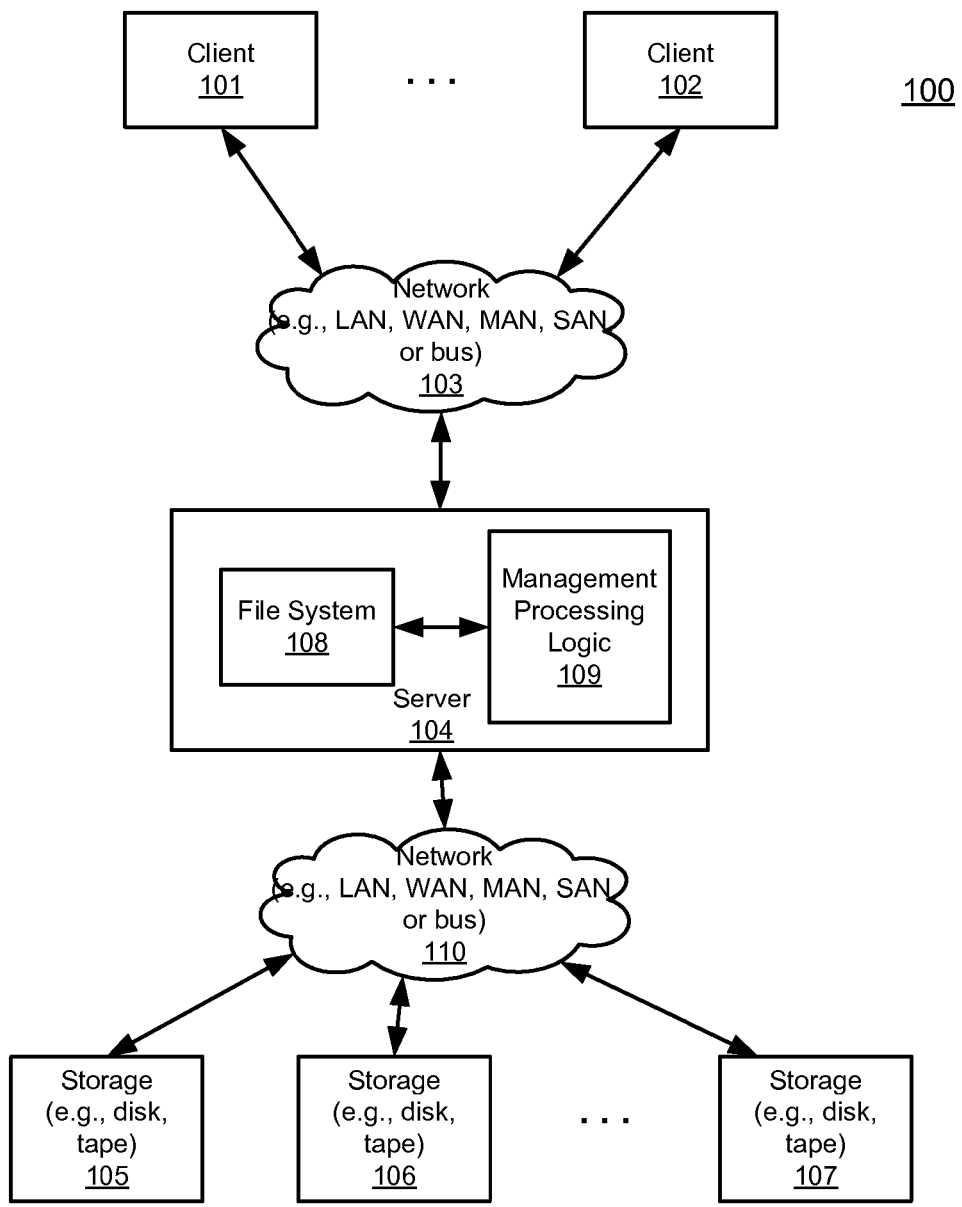
FIG. 1 is a block diagram illustrating a system configuration according to one embodiment of the invention.

FIG. 1 is a block diagram illustrating a system configuration according to one embodiment of the invention. Referring to FIG. 1, system configuration 100 includes, but is not limited to, one or more clients 101-102 communicatively coupled to a server 104 over a network 103 to access data stored in any of storage 105-107 over a network 110. Clients 101-102 may be any type of client such as a server, a personal computer, a "thin" client, a personal digital assistant (PDA), a Web enabled appliance, or a Web enabled cellular phone, etc. Server 104 may include any type of server or cluster of servers. For example, server 104 may be a storage server used for any of various different purposes, such as to provide multiple users with access to shared data and/or to back up mission critical data. Server 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Server 104 may have a distributed architecture, or all of its components may be integrated into a single unit.

Network 103 may be any type of network such as a local area network (LAN), a wide area network (WAN) such as Internet, a corporate intranet, a metropolitan area network (MAN), a storage area network (SAN), a bus, or a combination thereof. Likewise, network 110. Storage 105-107 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage 105-107 may also be combinations of such devices. In the case of disk storage media, the storage devices 105-107 may be organized into one or more volumes of Redundant Array of Inexpensive Disks (RAID). Server 104 and/or storage 105-107 may be implemented as part of an archive and/or backup system such as the deduplicating storage systems available from Data Domain, Inc. of Santa Clara, Calif.

According to one embodiment, server 104 includes a file system 108 and management processing logic 109 such as WORM processing logic. File system 108 may be any kind of file system. A file system generally refers to a structuring of data and metadata on a storage device, such as disks, which permits reading/writing of data on those disks and/or the processing logic to enable such structuring. The metadata is organized in data structures such as inodes that are used to store information about a data object (a file in this example), while the data blocks are structures used to store the actual data for the file. The information contained in an inode, as shown in FIG. 3A, may include, for example, ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file.

Management processing logic 109 may be implemented as part of file system 108 or a separate module communicatively coupled to the file system 108. According to one embodiment, in response to a request associated with a data object, the request received, for example, via an interface of file system 108, processing logic 109 examines the request to determine whether the request triggers certain additional actions besides ordinary actions associated with the request. In this example, processing logic 109 determines whether the request falls within certain categories that require the associated data object to be examined to determine whether the associated data object should be committed to be immutable before the ordinary actions associated with the request are performed. In this way, a data object is committed to be immutable in a "lazy" fashion, which in computer science terminology means only when it is necessary to do so. That is, a data object is committed to be immutable only when file system 108 receives a request that requires different handling depending on whether the data object is immutable. For example, a request that queries whether a data object is immutable is clearly dependent on whether the data object is immutable, and a request that attempts to modify a data object should be rejected if the data object is immutable.

Figure 2:
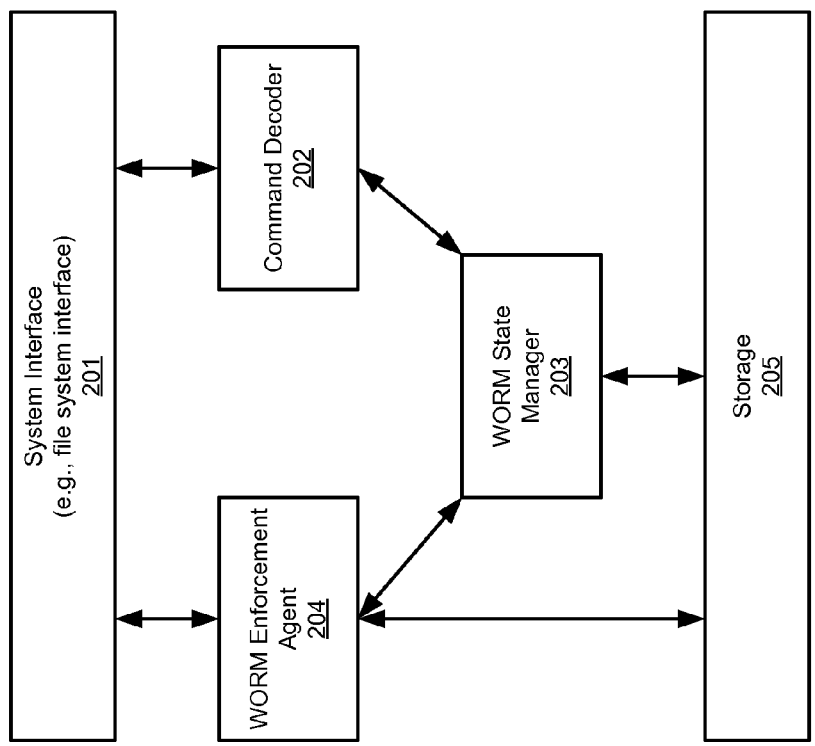
FIG. 2 is a block diagram illustrating a system for handling immutable data objects according to one embodiment of the invention.

FIG. 2 is a block diagram illustrating a system for managing data objects according to one embodiment of the invention. For example, system 200 may be implemented as part of management processing logic 109 and/or file system 108 of server 104 in FIG. 1. In this example, the management actions are actions related to managing immutable data objects. Referring to FIG. 2, system 200 includes, but is not limited to, a command decoder 202, a WORM state manager 203, and a WORM enforcement agent 204 coupled to a system interface 201 and storage 205. System interface 201 may be a part of file system interface that communicates with an application via various file system calls dependent upon an operating system associated with the file system. Storage 205 may be any kind of storage devices such as storage 105-107 of FIG. 1.

According to one embodiment, in response to a request associated with a data object, the request received, for example, via system interface 201, command decoder 202 examines the request to determine whether the request triggers certain additional actions besides ordinary actions associated with the request. In this example, command decoder 202 determines whether the request falls within certain categories that require the associated data object to be examined to determine whether the associated data object should be committed to be immutable before the ordinary actions associated with the request are performed. If it is determined that the associated data object should be committed to be immutable based on a variety of conditions or attributes associated with the request and/or associated data object, WORM state manager 203 is then invoked to commit the data object to be immutable. Thereafter, the ordinary actions associated with the request are performed.

Note that the ordinary actions associated with the request may be performed differently dependent upon whether the associated data object is immutable when the actions are performed. For example, if a request to delete a data object triggers the data object to be committed to be immutable, the request to delete the data object will be rejected by WORM enforcement agent 204. On the other hand, if the data object is not immutable and the request does not trigger the data object to be committed to be immutable, the WORM enforcement agent 204 will not cause the request to be rejected.

In one embodiment, the determination of whether a data object should be committed to be immutable is made only when the received request requires different handling depending on whether the data object is immutable. For example, the determination is not made for a request that queries an attribute (e.g. owner, size, content, etc.) of the data object that is unrelated to whether the data object is immutable. The determination is made for a request that attempts to modify the data object or that queries an attribute (e.g. immutability, retention period, etc.) that may be affected by whether the data object is immutable.

In one embodiment, determining whether a data object should be committed to be immutable includes checking whether all the content and attributes of the data object have been received by the system. In one embodiment, determining whether a data object should be committed to be immutable includes checking whether the data object has been closed (e.g., via a File Close API). In one embodiment, determining whether a data object should be committed to be immutable includes checking whether the data object has been recently updated.

In one embodiment, determining whether a data object should be committed to be immutable includes checking if the data object was last modified more than a predetermined period in the past. For example, in a UNIX file system, the determination can be made by comparing the "mtime" or "ctime" of the file to the current time. If the "mtime" or "ctime" of the file is more than a predetermined period in the past, for example, specified in a parameter such as "auto-worm_delay", then the file should be committed to be immutable. As a result, the command decoder 202 may invoke WORM state manager 203 to commit the file (data object) to be immutable. If the ordinary actions associated with the request include modifying the data object, an error may be returned indicating that the data object associated with the request is immutable.

In one embodiment, a retention period is associated with an immutable data object and the system protects the data object file from being modified or deleted during this retention period. In one embodiment, a default retention period is associated with the data object when it is committed to be immutable. In one embodiment, the system allows the retention period of an immutable data object to be extended by setting its "atime" into the future. Detailed information regarding this technique can be found in a co-pending U.S. patent application Ser. No. 11/839,453, entitled "System and Method for Providing Write-Once-Read-Many (WORM) Storage," filed Aug. 15, 2007, which is incorporated by reference herein in its entirety.

In one embodiment, the committing of data objects to be immutable, as described, is a feature that is enabled and/or configured on a subset (e.g. volume, directory, pool, collection, file, group of files, files of certain type, files with certain filename extension, etc.) of the storage system, and determining whether the data object should be committed to be immutable includes determining whether the data object is associated with a subset of the system that has the feature enabled. In one embodiment, a default retention period is associated with a subset of the system, and committing a data object to be immutable includes determining the default retention period for the subset of the system associated with the data object and associating the determined default retention period with the data object.

In one embodiment, a parameter for specifying a delay period such as "autoworm_delay" is associated with a subset of the system, and determining whether the data object should be committed to be immutable includes determining the "autoworm_delay" value associated with the subset of the system that is associated with the data object and determining whether the data object was last modified more than the determined "autoworm_delay" value in the past. In one embodiment, determining whether the data object should be committed to be immutable includes determining the "autoworm_delay" value associated with the subset of the system that is associated with the data object and determining whether the data object was last closed (e.g. via a File Close API) more than the determined "autoworm_delay" value in the past. Other configurations may exist.

Figure 3:
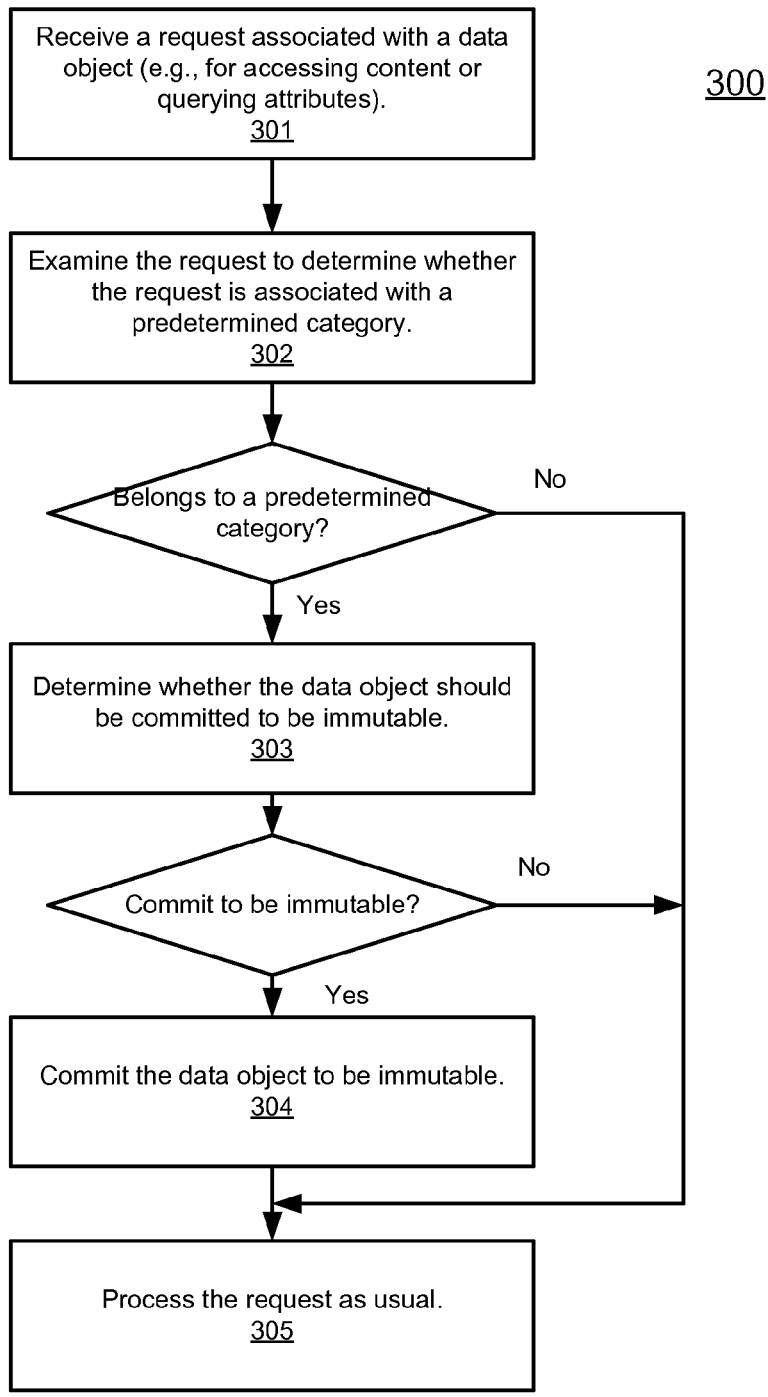
FIG. 3 is a flow diagram illustrating a process for committing a data object to be immutable according to one embodiment of the invention.

FIG. 3 is a flow diagram illustrating a process of committing a data object to be immutable according to one embodiment of the invention. Note that process 300 may be performed by processing logic which may include software, hardware, or a combination thereof. For example, process 300 may be performed by system 200 of FIG. 2. Referring to FIG. 3, at block 301, processing logic receives a request associated with a data object, such as, for example, for accessing content or attributes of the data object.

At block 302, processing logic examines the request to determine whether the request is associated with a predetermined category. If so, certain additional or special actions may be performed, in addition to ordinary actions associated with the request. In one embodiment, the additional or special actions include an action to determine whether the associated data object should be committed to be immutable, for example, using the techniques described above.

If it is determined that the request does not fall within the predetermined category, at block 305, the request is then processed as an ordinary request. If however, it is determined that the request falls within the predetermined category, at block 303, processing logic determines whether the associated data object should be committed to be immutable, for example, using the techniques set forth above. At block 304, if it is determined that the data object should be committed to be immutable, the data object is committed to be immutable. Thereafter, at block 305, the request is processed as usual dependent upon whether the data object is immutable. Other operations may also be performed.

Figure 4:
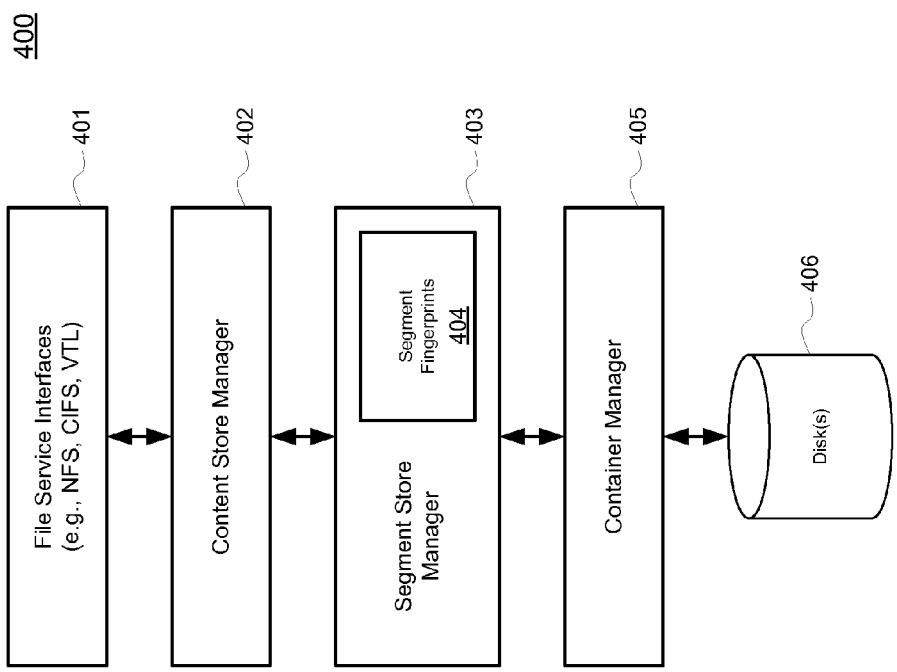
FIG. 4 is a block diagram illustrating an example of a storage system which may be used with an embodiment of the invention.

According to certain embodiments, the techniques described above can be used in a deduplicating data storage system such as those available from Data Domain, Inc. of Santa Clara, Calif. FIG. 4 is a block diagram illustrating an example of a data storage system which may be used with an embodiment of the invention. For example, system 400 may be implemented as part of systems as shown in FIGS. 1-2. In this example, system 400 is a deduplicating data storage system. Referring to FIG. 4, system 400 includes, but it is not limited to, file service interface 401, content store manager 402, segment store manager 403 having segment fingerprints 404, and container manager for managing segments stored in containers in disk or disks 406.

According to one embodiment, system 400 breaks a data object (e.g., a file) into variable-length segments in a content dependent manner and computes a fingerprint for each segment. System 400 uses the fingerprints both to identify duplicate segments and as part of a segment descriptor used to reference a segment. It represents files as sequences of segment fingerprints. During writes, system 400 identifies duplicate segments and does its best to store only one copy of any particular segment. Before storing a new segment, system 400 may use a variation of the Ziv-Lempel algorithm to compress the segment.

In one embodiment, system 400 supports multiple access protocols which are layered on a common file services interface 401. Supported protocols include a network file system (NFS), a common Internet file system (CIFS), and a virtual tape library interface (VTL), etc.

When a data stream enters the system, it goes through one of the standard interfaces to the generic file services layer, which manages the name space and file metadata. The file services layer forwards write requests to content store 402 which manages the data content within a file. Content store 402 breaks a data stream into segments, uses segment store 403 to perform deduplication, and keeps track of the references for a file (e.g., mapping between logical data objects and physical data objects). Segment store 403 does the actual work of deduplication. It packs deduplicated (unique) segments into relatively large units, compresses such units using a variation of Ziv-Lempel algorithm to further compress the data, and then writes the compressed results into containers supported by container manager 405.

To read a data stream from the system, a client drives the read operation through one of the standard interfaces and the file services layer 401. Content store 402 uses the references to deduplicated segments to deliver the desired data stream to the client. Segment store prefetches, decompresses, reads and caches data segments from container manager 405.

According to one embodiment, content store 402 implements byte-range writes and reads for deduplicated data objects, where an object is a linear sequence of client data bytes and has intrinsic and client-settable attributes or metadata. An object may be a conventional file, a backup image of an entire volume or a tape cartridge.

To write a range of bytes into an object, content store 402 performs several operations. First, anchoring partitions the byte range into variable-length segments in a content dependent manner. Then segment fingerprinting computes a hash such as the SHA-1 hash and generates the segment descriptor based on it. Each segment descriptor contains per segment information of at least fingerprint and size. Further, segment mapping builds the tree of segments that records the mapping between object byte ranges and segment descriptors. The goal is to represent a data object using references to deduplicated segments.

To read a range of bytes in an object, content store 402 traverses the tree of segments created by the segment mapping operation above to obtain the segment descriptors for the relevant segments. It fetches the segments from Segment Store and returns the requested byte range to the client.

Segment store 403 is essentially a database of segments keyed by their segment descriptors 404. To support writes, it accepts segments with their segment descriptors and stores them. To support reads, it fetches segments designated by their segment descriptors. To write a data segment, segment store performs several operations. First, segment filtering determines if a segment is a duplicate. This is the key operation to deduplicate segments and may trigger disk I/Os, thus its overhead can significantly impact throughput performance. Further, container packing adds segments to be stored to a container which is the unit of storage in the system. The packing operation also compresses segment data using a variation of the Ziv-Lempel algorithm. A container, when fully packed, is appended to the Container Manager. Finally, segment indexing updates the segment index that maps segment descriptors to the container holding the segment, after the container has been appended to the container manager 405.

To read a data segment, segment store 403 performs certain operations. First, segment lookup finds the container storing the requested segment. This operation may trigger disk I/Os to look in the on-disk index, thus it is throughput sensitive. Container retrieval reads the relevant portion of the indicated container by invoking the container manager 405. Container unpacking decompresses the retrieved portion of the container and returns the requested data segment.

The container manager 405 provides a storage container log abstraction, not a block abstraction, to segment store 403. A container includes a metadata section having the segment descriptors for the stored segments. They are immutable in that new containers can be appended and old containers deleted, but containers cannot be modified once written. When segment store 403 appends a container, the container manager 405 returns a container ID which is unique over the life of the system.

The container manager 405 is responsible for allocating, deallocating, reading, writing and reliably storing containers. It supports reads of the metadata section or a portion of the data section, but it only supports appends of whole containers. If a container is not full but needs to be written to disk, it is padded out to its full size.

Container manager 405 is built on top of standard block storage 406. Advanced techniques such as software RAID-6, continuous data scrubbing, container verification, and end to end data checks are applied to ensure a high level of data integrity and reliability.

The container abstraction offers several benefits: 1) the fixed container size makes container allocation and deallocation easy; 2) the large granularity of a container write achieves high disk throughput utilization; and 3) a properly sized container size allows efficient full-stripe RAID writes, which enables an efficient software RAID implementation at the storage layer.

According to one embodiment, certain components of system 400, such as file service interface, includes a logic configured to commit a file to be immutable using the techniques set forth above. Other configurations may also exist.

Figure 5:
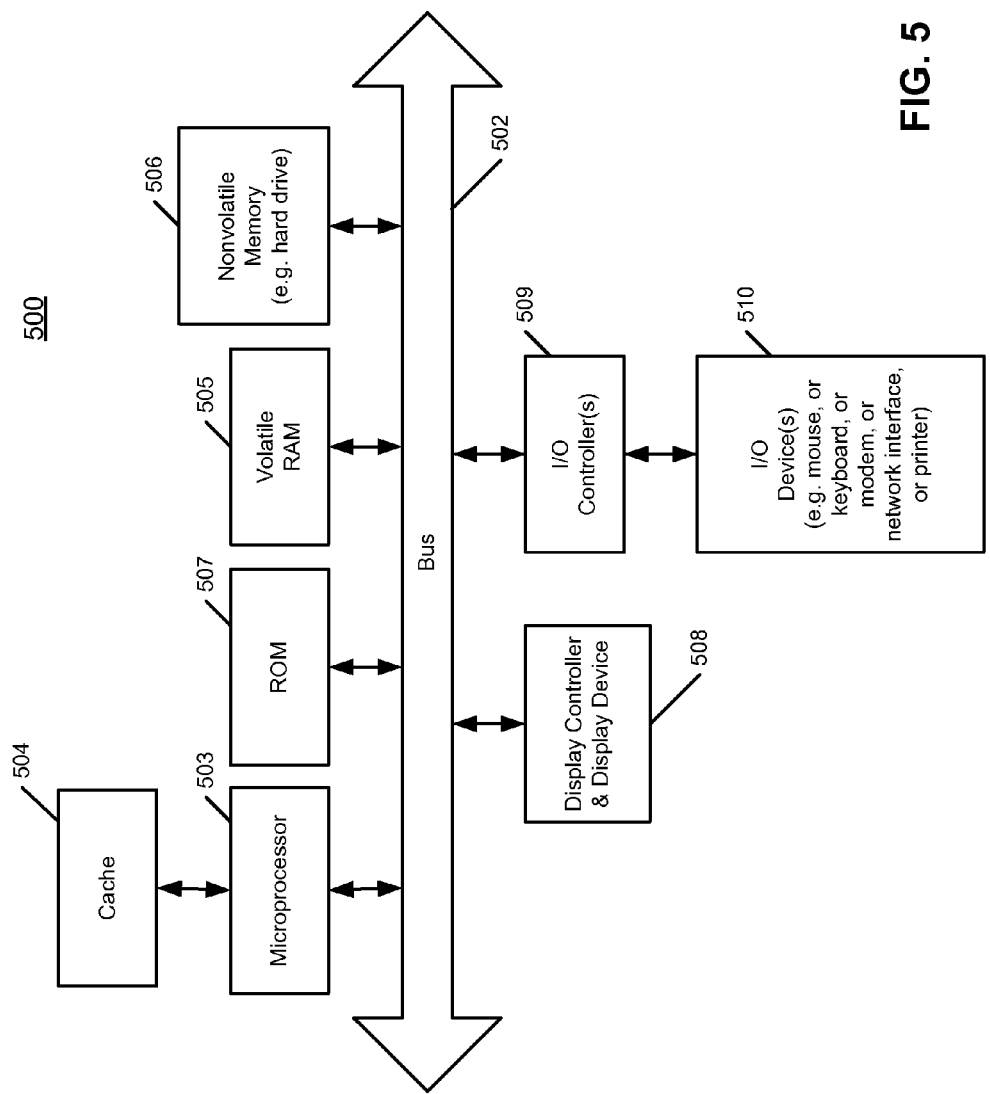
FIG. 5 is a block diagram of a data processing system which may be used with one embodiment of the invention.

FIG. 5 is a block diagram of a data processing system which may be used with one embodiment of the invention. For example, the system 500 shown in FIG. 5 may be used as a client computer system such as clients 101-102 of FIG. 1. Alternatively, the exemplary system 500 may be implemented as a server 104 of FIG. 1.

Note that while FIG. 5 illustrates various components of a computer system, it is not intended to represent any particular architecture or manner of interconnecting the components; as such details are not germane to the present invention. It will also be appreciated that network computers, handheld computers, cell phones, and other data processing systems which have fewer components or perhaps more components may also be used with the present invention. The computer system of FIG. 5 may, for example, be an Apple Macintosh computer or an IBM compatible PC.

As shown in FIG. 5, the computer system 500, which is in a form of a data processing system, includes a bus or interconnect 502 coupled to a processor 503 and a ROM 507, a volatile RAM 505, and a non-volatile memory 506. Processor 503 may include multiple processors and/or core logics that constitute central processing units (CPUs) of the system and thus, control the overall operations of the system. According to certain embodiments, processor 503 accomplish this by executing software stored in any of the memories 505-507, such as, for example, applications and operating system, etc. Processor 503 may include, one or more programmable general-purpose or special-purpose microprocessors, digital signal processors (DSPs), programmable controllers, application specific integrated circuits (ASICs), programmable logic devices (PLDs), or the like, or a combination of such devices.

The processor 503, which may be, for example, an Intel processor or a PowerPC processor, is coupled to cache memory 504 as shown in the example of FIG. 5. The bus 502 interconnects these various components together and also interconnects these components 503 and 505-507 to a display controller and display device 508, as well as to input/output (I/O) devices 510, which may be mice, keyboards, modems, network interfaces, printers, and other devices which are well-known in the art.

Typically, the input/output devices 510 are coupled to the system through input/output controllers 509. The volatile RAM 505 is typically implemented as dynamic RAM (DRAM) which requires power continuously in order to refresh or maintain the data in the memory. The non-volatile memory 506 is typically a magnetic hard drive, a magnetic optical drive, an optical drive, a DVD RAM, a Flash memory, or other type of memory system which maintains data even after power is removed from the system. Typically, the non-volatile memory will also be a random access memory, although this is not required.

While FIG. 5 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals. Alternatively, I/O controller 509 may include an IEEE-1394 adapter, also known as FireWire adapter, for controlling FireWire devices. Other components may also be included.

Thus, techniques for committing data objects to be immutable have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing data objects, comprising:
in response to a request received through an interface of a storage system, wherein the request is to modify or delete content of a data object stored in the storage system, determining whether the data object should be committed as a write-once-read-many (WORM) object, wherein the data object is not the WORM object prior to receiving the request, and wherein determining whether the data object should be committed as the WORM object is only performed when the request to modify or delete content of the data object is received, wherein determining whether the data object should be committed as the WORM object comprises determining whether the data object has been modified within a last predetermined period of time, including comparing a time attribute of the data object against a current time, wherein if a difference between the time attribute and the current time is greater than a predetermined threshold, the data object should be committed as the WORM object, and wherein the time attribute comprises one of modified time (mtime) and creation time (ctime) attributes associated with the data object;
committing the data object as the WORM object if it is determined that the data object should be committed as the WORM object, wherein the data object is committed as the WORM object if the data object has not been modified within the last predetermined period of time;
modifying or deleting the data object according to the request if it is determined that the data object should not be committed as the WORM object; and
rejecting the request if it is determined that the data object should be committed as the WORM object.

2. The method of claim 1, further comprising examining the request to determine whether a result of the action associated with the request would likely be different if the data object were immutable, wherein determining whether the data object should be committed as the WORM object is performed if it is likely that the result of the action would be different if the data object were immutable.

3. The method of claim 1, wherein determining whether the data object should be committed as the WORM object is performed only when the request requires different handling dependent upon whether the data object is immutable.

4. The method of claim 1, wherein the data object is associated with a subset of the storage system having a plurality of subsets, wherein the predetermined threshold is configured and associated with the subset of the storage system containing the data object, and wherein the predetermined threshold is different from at least one predetermined threshold of another one of the plurality of subsets.

5. The method of claim 1, wherein committing the data object as the WORM object comprises associating a retention period with the data object during which the data object is protected from modification.

6. The method of claim 5, wherein associating the retention period with the data object comprises setting the time attribute of the data object to a time beyond a current time.

7. The method of claim 6, wherein the time attribute for retention period is a last access time (atime) attribute of the data object.

8. A non-transitory machine-readable medium having instructions stored therein, which when executed by a processor, cause the processor to perform a method for managing data objects, the method comprising:
in response to a request received through an interface of a storage system, wherein the request is to modify or delete a data object stored in the storage system, determining whether the data object should be committed as a write-once-read-many (WORM) object, wherein the data object is not the WORM object prior to receiving the request, and wherein determining whether the data object should be committed as the WORM object is only performed when the request to modify or delete content of the data object is received, wherein determining whether the data object should be committed as the WORM object comprises determining whether the data object has been modified within a last predetermined period of time, including comparing a time attribute of the data object against a current time, wherein if a difference between the time attribute and the current time is greater than a predetermined threshold, the data object should be committed as the WORM object, and wherein the time attribute comprises one of modified time (mtime) and creation time (ctime) attributes associated with the data object;
committing the data object as the WORM object if it is determined that the data object should be committed as the WORM object, wherein the data object is committed as the WORM object if the data object has not been modified within the last predetermined period of time;
modifying or deleting the data object according to the request if it is determined that the data object should not be committed as the WORM object; and
rejecting the request if it is determined that the data object should be committed as the WORM object.

9. The non-transitory machine-readable medium of claim 8, wherein the method further comprises examining the request to determine whether a result of the action associated with the request would likely be different if the data object were immutable, wherein determining whether the data object should be committed as the WORM object is performed if it is likely that the result of the action would be different if the data object were immutable.

10. The non-transitory machine-readable medium of claim 8, wherein determining whether the data object should be committed as the WORM object is performed only when the request requires different handling dependent upon whether the data object is immutable.

11. The non-transitory machine-readable medium of claim 8, wherein the data object is associated with a subset of the storage system having a plurality of subsets, wherein the predetermined threshold is configured and associated with the subset of the storage system associated with the data object, and wherein the predetermined threshold is different from at least one predetermined threshold of another one of the plurality of subsets.

12. The non-transitory machine-readable medium of claim 8, wherein committing the data object as the WORM object comprises associating a retention period with the data object during which the data object is protected from modification.

13. The non-transitory machine-readable medium of claim 12, wherein associating the retention period with the data object comprises setting a time attribute of the data object to a time beyond a current time.

14. The non-transitory machine-readable medium of claim 13, wherein the time attribute for retention period is a last access time (atime) attribute of the data object.

15. An apparatus for managing data objects, comprising:
an interface to receive a request to modify or delete a data object stored in a storage system;
a command decoder, executed in a memory by a processor of a data processing system, to determine whether the data object should be committed as a write-once-read-many (WORM) object, wherein the data object is not the WORM object prior to receiving the request, and wherein determining whether the data object should be committed as the WORM object is only performed when the request to modify or delete content of the data object is received, wherein determining whether the data object should be committed as the WORM object comprises determining whether the data object has been modified within a last predetermined period of time, including comparing a time attribute of the data object against a current time, wherein if a difference between the time attribute and the current time is greater than a predetermined threshold, the data object should be committed as the WORM object, and wherein the time attribute comprises one of modified time (mtime) and creation time (ctime) attributes associated with the data object;
a WORM state manager, executed in the memory by the processor, to commit the data object as the WORM object if the command decoder determines that the data object should be committed as a WORM object, wherein the data object is committed as the WORM object if the data object has not been modified within the last predetermined period of time;
a command processing logic, executed in the memory by the processor, to modify or delete the data object according to the request if it is determined that the data object should not be committed as the WORM object, and to reject the request if it is determined that the data object should be committed as the WORM object.

16. The apparatus of claim 15, further comprising the WORM enforcement agent, executed in the memory by the processor, to enforce one or more policies for protecting the data object from modification if the data object has been committed as an immutable data object, when the command processing logic performs the action associated with the request.

17. The apparatus of claim 15, wherein the command decoder is further to examine the request to determine whether a result of the action associated with the request would likely be different if the data object were immutable, wherein determining whether the data object should be committed as the WORM object is performed if it is likely that the result of the action would be different if the data object were immutable.

18. The apparatus of claim 15, wherein the determination of whether the data object should be committed as the WORM object is performed only when the request requires different handling dependent upon whether the data object is immutable.

19. The apparatus of claim 15, wherein the data object is associated with a subset of the storage system having a plurality of subsets, wherein the predetermined threshold is configured and associated with the subset of the storage system containing the data object, and wherein the predetermined threshold is different from at least one predetermined threshold of another one of the plurality of subsets.

20. The apparatus of claim 15, wherein committing the data object as the WORM object comprises associating a retention period with the data object during which the data object is protected from modification.

21. The apparatus of claim 20, wherein associating the retention period with the data object comprises setting a time attribute of the data object to the time beyond the current time.

22. The apparatus of claim 21, wherein the time attribute for retention period is a last access time (atime) attribute of the data object.

* * * * *